(12) United States Patent
Bennett et al.

(10) Patent No.: US 8,509,686 B2
(45) Date of Patent: Aug. 13, 2013

(54) AUXILIARY CELLULAR PHONE MODULE

(75) Inventors: James D. Bennett, Hroznetin (CZ); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 833 days.

(21) Appl. No.: 12/547,398

(22) Filed: Aug. 25, 2009

(65) Prior Publication Data

US 2011/0053640 A1    Mar. 3, 2011

(51) Int. Cl.
*H04B 7/00* (2006.01)

(52) U.S. Cl.
USPC ............... 455/41.2; 455/550.1; 455/552.1; 455/556.1; 455/553.1; 455/426.1; 455/421; 455/422.1

(58) Field of Classification Search
USPC ............ 455/550.1, 552.1, 556.1, 41.2, 553.1, 455/426.1, 421, 422.1
See application file for complete search history.

(56) References Cited

U.S. PATENT DOCUMENTS

| | | | |
|---|---|---|---|
| 6,018,665 A * | 1/2000 | Chavez et al. | 455/462 |
| 7,242,905 B2 * | 7/2007 | Kim | 455/41.2 |
| 7,403,793 B2 * | 7/2008 | Mauney et al. | 455/552.1 |
| 7,603,145 B2 * | 10/2009 | Zinn et al. | 455/574 |
| 7,627,344 B2 * | 12/2009 | Ying | 455/557 |
| 8,195,232 B2 * | 6/2012 | Ying | 455/557 |
| 2004/0204117 A1 * | 10/2004 | Weiner | 455/564 |
| 2004/0266482 A1 * | 12/2004 | Juntunen | 455/558 |
| 2005/0107037 A1 * | 5/2005 | Delmulle et al. | 455/41.2 |
| 2008/0132164 A1 * | 6/2008 | Bugenhagen et al. | 455/11.1 |
| 2010/0062763 A1 * | 3/2010 | Sato et al. | 455/432.3 |

* cited by examiner

*Primary Examiner* — April G Gonzales
(74) *Attorney, Agent, or Firm* — Garlick & Markison; Randy W. Lacasse

(57) ABSTRACT

An auxiliary cellular phone module assists in making a local call while a coupled master cellular phone is roaming, wherein the auxiliary cellular phone module consists of processing unit, communication interface, cellular telephony interface, user interfaces and memory. A full-fledged auxiliary cellular phone module consists of a plurality of features that includes user interfaces consisting display, full-fledged keypad, wired and/or wireless interfaces, earpiece and microphones. A simpler version may have simplified or none at all of any of the user interfaces mentioned above. A full-fledged auxiliary cellular phone module may have many additional functionalities that helps a roaming service provider to cut costs of the local calls placed while roaming, that includes audio/visual advertisements, directions as well as many other audio/visual informational data displays. Moreover, many other features that are helpful to the roaming client may also be provided within the auxiliary cellular phone module that includes local phone book facilities, prepaid credit information and other informal data displays.

38 Claims, 13 Drawing Sheets

705

```
┌──────────────────────────────────────────────────────────┐
│ Interface with a Master Cellular Phone to Support Loading│
│ of Auxiliary Cellular Phone Module Interoperability      │
│ Software onto The Master Cellular Phone 709              │
└──────────────────────────────────────────────────────────┘
                            │
┌──────────────────────────────────────────────────────────┐
│ Interface with the Master Cellular Phone to Determine a  │
│ Roaming Status of the Master Cellular Phone 711          │
└──────────────────────────────────────────────────────────┘
                            │
┌──────────────────────────────────────────────────────────┐
│ When the Master Cellular Phone is Roaming, Initiate a    │
│ Non-roaming Cellular call on behalf of the Master        │
│ Cellular Phone via the Cellular Telephony Interface 713  │
└──────────────────────────────────────────────────────────┘
                            │
┌──────────────────────────────────────────────────────────┐
│ Service the Cellular Call on behalf of the Master        │
│ Cellular Phone; by ways of Communication Passing between │
│ the Master Cellular phone, the Communications Interface, │
│ and the Cellular Telephony Interface 715                 │
└──────────────────────────────────────────────────────────┘
```

FIG. 7

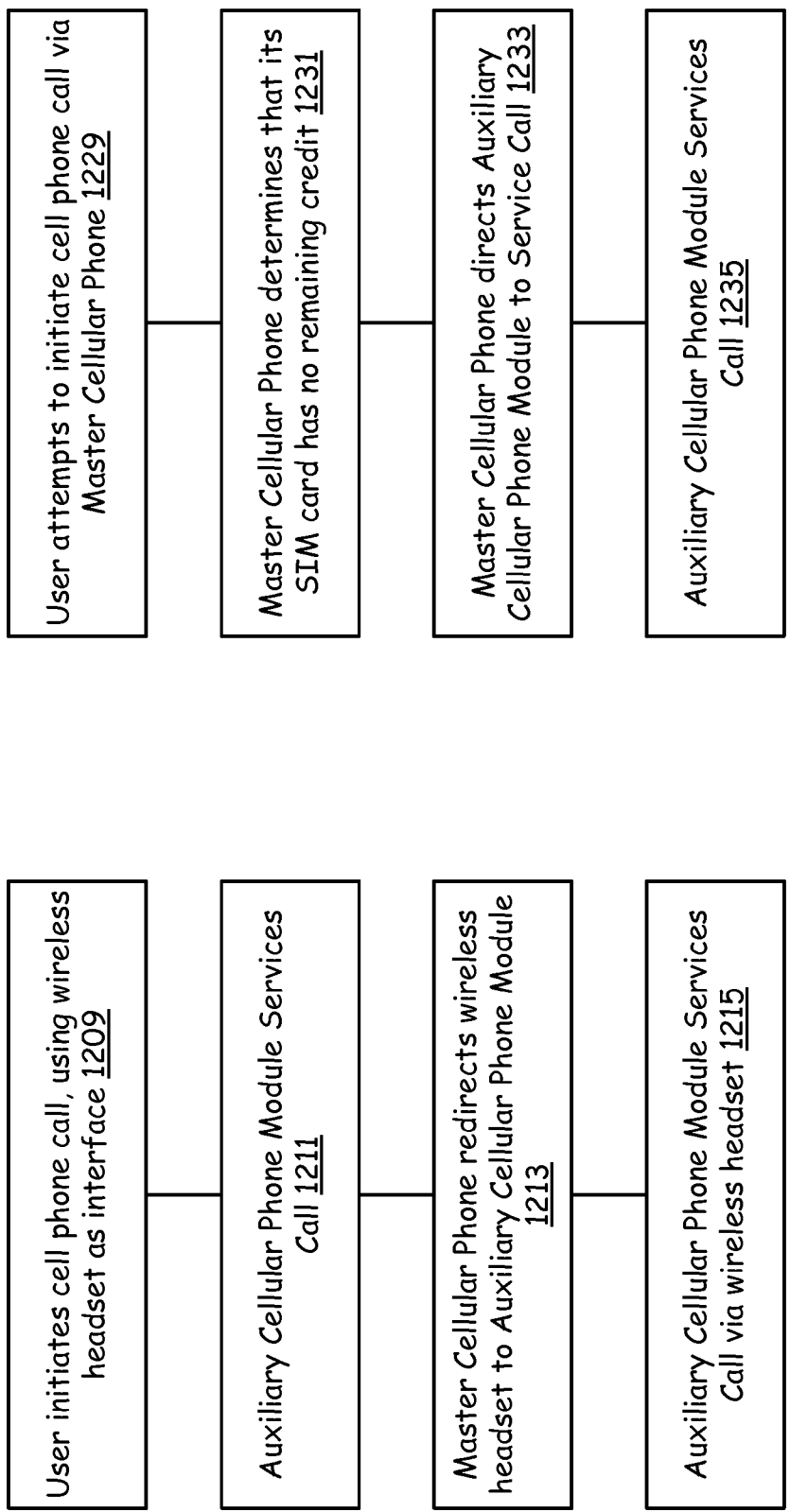

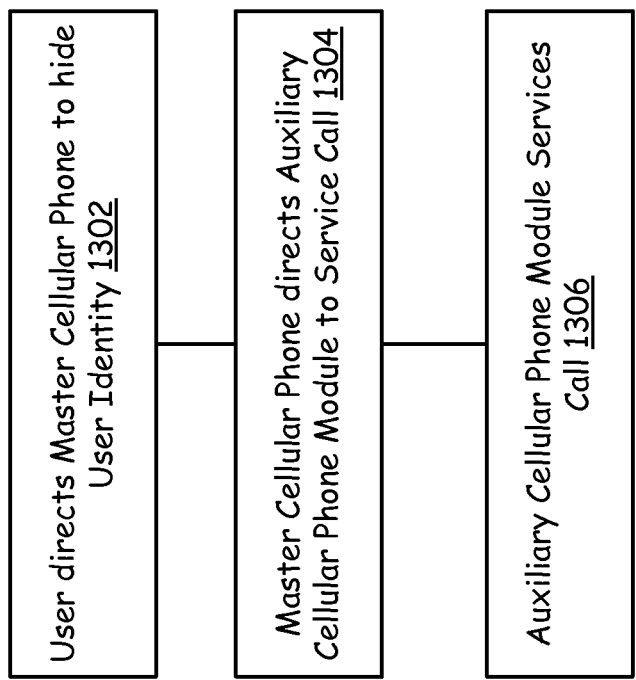

AUXILIARY CELLULAR PHONE MODULE

BACKGROUND

1. Technical Field

The present invention relates generally to cellular telephony; and, more particularly, to cellular telephony system access.

2. Related Art

Cellular phones (mobile phones, as they are known in few regions) are now a part of most human lives and have become a necessity of rather than a luxury as they once were. A few of the reasons for such is based upon the human need to communicate with others that arises from the needs of social networking, businesses, call conferencing, news receipt, business/stock market news and information gathering, emailing, and emergency calls. Such services and uses are now available in a cost effective manner by which anyone can accomplish the abovementioned tasks, simply by using a cellular phone handset.

Cellular phone handset costs have come down consistently over time because of consistently growing demands for them, reduced component and manufacturing costs, and competition between the manufacturers themselves for users. Some cellular phone operators service tens of millions of cellular phone handsets and provide service worldwide, while some cellular phone operators provide regional service. In other words, some operators service their subscribed cellular phone handsets in only one or more cities (or similarly, few other nearby localities), others service subscribed cellular handsets in many cities (and equally covering a larger nearby localities), some nationally, and still other internationally. Hence, there is a large variance in each of the operator's coverage characteristics of their client cellular phone handsets. Every one of these operator's coverage characteristics also include a great deal of non-coverage pockets where they cannot provide services to their clients.

Considering the abovementioned variance problem from the perspective of the users of these cellular phone handsets, in addition to their home service providers (operators), they also have to be dependent upon many other roaming service providers (operators), while they are on the move. The call charges of these roaming service providers are typically, unreasonably high; often in terms of many multiples of local phone call charges, even when they are making calls locally (within the roaming cities or localities).

Neither the service providers providing roaming service nor the home service providers (nor the users of the cellular phone handsets) stand to benefit in these roaming scenarios. This is because the roaming service providers make it a priority to service only their more permanent clients while the home service providers simply have no reason to expand their service infrastructures in those roaming regions because of many of their own reasons. Hence, the users of the cellular phone handsets end up having to bear these unreasonably high costs.

These and other limitations and deficiencies associated with the related art may be more fully appreciated by those skilled in the art after comparing such related art with various aspects of the present invention as set forth herein with reference to the figures.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

FIG. 7 is a flow diagram illustrating operation of an auxiliary cellular phone module according to one or more aspects of the present invention;

FIG. 12A is a flow diagram illustrating still other operations of an auxiliary cellular phone module according to one or more aspects of the present invention;

FIG. 12B is a flow diagram illustrating still other operations of an auxiliary cellular phone module according to one or more aspects of the present invention; and FIG. 13 is a flow diagram illustrating additional operations of an auxiliary cellular phone module according to one or more aspects of the present invention.

DETAILED DESCRIPTION OF THE DRAWINGS

Figure 1:
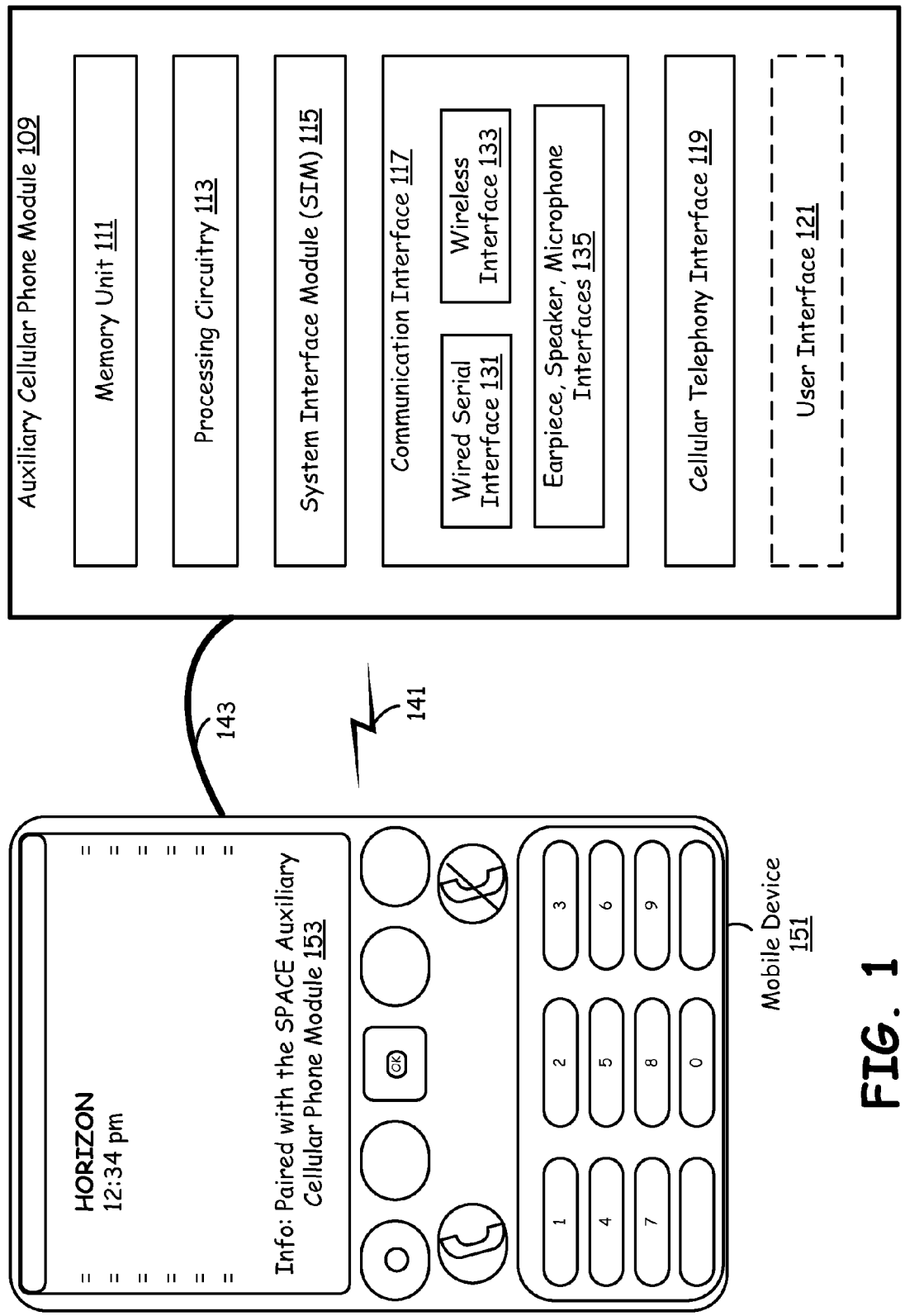
FIG. 1 is a schematic block diagram illustrating an auxiliary cellular phone module that assists in making a local call while a host cellular phone module is roaming.

FIG. 1 is a schematic block diagram illustrating an auxiliary cellular phone module that assists in making a local call while a host cellular phone module is roaming. In this description the terms "phone" and "telephone" are used interchangeable and have the same/similar meaning. Shown in FIG. 1 is an auxiliary cellular phone module 109 that assists in making a local call for a master cellular phone 451 (mobile device) while roaming, wherein the auxiliary cellular phone module 109 includes processing unit 113 (or processing circuitry 113), System Interface Module (SIM) 115, communication interface 117, cellular telephony interface 119, user interfaces 121 and memory 111, in accordance with one of the embodiments of the present invention. The auxiliary cellular phone module 109 allows the user of a cellular phone handset 151 (alternatively, a mobile device 151 or master cellular telephone 151) to place a local call, while the mobile device 151 is roaming (in another city or locality, where the home operator's service coverage to the master cellular telephone 151 is not available or placing a local is not possible). In effect, the auxiliary cellular phone module 109, in conjunction with the master cellular telephone 151, makes the phone call placed via a roaming partner operator a non-roaming call; thus, making the roaming call placed in a roaming locality highly cost effective. The processing circuitry 113 may be a digital signal processor, a system processor, custom circuitry, or a combination thereof. The memory 111 may be RAM, ROM, magnetic memory, flash memory, or another type of memory capable of storing instructions and/or data.

The processing circuitry 113 of the auxiliary cellular phone module 109 functions in a plurality of ways, to make the master cellular telephone 151, in conjunction with the auxiliary cellular phone module 109, place effectively a local phone call, while the master cellular telephone 151 is roaming (by utilizing the cellular telephony interface 119, SIM 113, communication interface 117, and user interfaces 121). Operations of the auxiliary cellular phone module 109 include one or more of: (a) Interfacing with the master cellular telephone 151 to support loading of auxiliary cellular phone module 109 interoperability software onto the master cellular telephone 151; (b) Interfacing with the master cellular telephone 151 to determine a roaming status of the master cellular telephone 151; (c) Initiating a non-roaming cellular call on behalf of the master cellular telephone 151 via the cellular telephony interface 119, when the master cellular telephone 151 is roaming; (d) Servicing the cellular call on behalf of the master cellular telephone 151, by ways of passing communications between the master cellular telephone 151, communication interface 117, and cellular telephony interface 119 (the servicing the cellular call on behalf of the master cellular telephone 109 also includes utilizations of user interfaces 121, if such a provision is made available to the user, in the auxiliary cellular phone module 109); (e) Supporting audio communications via the earpiece, microphone, and communications interfaces 135; (f) Supporting wired interface 131, operable to communicate with the master cellular telephone 151 and cellular telephony interface 119; and/or (g) Supporting wireless network interface 133 operable to wirelessly communicate with the master cellular telephone 151 to support communications between the master cellular telephone 151 and the cellular telephony interface 119.

All of the above features/functions/components may not be present with some embodiments of the auxiliary cellular phone modules 109 described herein. Typical components of the cellular phone module 109 include processing circuitry 113, SIM 115, a communication interface 117, and a cellular telephony interface 119. Other of the aforementioned optional features/components may be available only in some other auxiliary cellular phone modules 109. For example, with some embodiments, the auxiliary cellular phone module 109 may have no user interfaces 121 at all (a black box that is disposable after usage), a simplified keypad and/or small display (here, the auxiliary cellular phone modules 109 may be returned after usage), or a full-fledged auxiliary cellular phone module 109 (having all of the user interfaces 121, such as a full-fledged keypad and/or large display). Similarly, a basic auxiliary cellular phone module 109 may have a built in power supply (built-in battery that last for a certain predetermined duration), while a full-fledged auxiliary cellular phone module 109 may come with a replaceable battery compartments or even a rechargeable battery unit.

In operation, the auxiliary cellular phone module 109, using wired 131, 143 or wireless interface 133, 141 features (such as a Bluetooth connection), pairs with the master cellular telephone 151, 153 (the user may have to enter pairing key code, in case of a Bluetooth connection) and allows the user to use either the keypad of the mobile device 151 or the other user interfaces 121 to place local calls while roaming. Alternatively, the auxiliary cellular phone module 109 may allow the user to utilize the master cellular telephone's 151 user interfaces to place local calls while roaming. In other words, the user may be able to use any of the user interfaces, such as 121, of either or both of auxiliary cellular phone module 109 and master cellular telephone 151 to place a local call by using the services of the roaming operator.

Many additional features may also be available in some of the auxiliary cellular phone modules 109, that include: (a) Support to receive a called number from a phone book of the master cellular telephone 151 when initiating the non-roaming cellular call; (b) Display prepaid call credit and other information, associated with the SIM 115, in the display of auxiliary cellular phone module 109; (c) Support emergency cellular telephony calls via the user interfaces 121; (d) Support a local phone book; (e) Support to transmit information via the communications interface 117 to the master cellular telephone 151 for display on a user interfaces 153 of the master cellular telephone 151; (f) Direct the master cellular telephone 151 to disable a master cellular telephone 151 cellular telephony interface when the cellular telephony interface 119 services the cellular call; and (g) Direct the master cellular telephone 151 to disable a master cellular telephone 151 cellular telephony interface when the auxiliary cellular phone module 109 detects operation within its home cellular network. The abovementioned display of information that assists the roaming partner operator to cut costs to the user may easily include advertising content, cellular network information, directions, audio content, and video content.

To summarize the various embodiments of the present invention, services to the auxiliary cellular phone module 109 are provided by third party roaming operator, in conjunction with the home operator, while roaming (where the home operator's coverage is not available) or when the coverage is poor. Typically, the roaming operator's associated costs to place calls locally, while roaming, are dramatically high; in this case, the user may opt to utilize the auxiliary cellular phone module 109. Consequently (and, for instance), the user when landing in a roaming city airport may buy (or rent) an auxiliary cellular phone module 109 that in various embodiments: a) has no battery, keyboard or display; b) has a cellular radio, antenna, processing circuitry 113, (prepaid) SIM card 115, a power/data bus port and port interface circuitry; and c) is small in relation to the traveler's phone. The auxiliary cellular phone module 109 docks via a USB or other power/data port available on the master cellular telephone 151. It could also be tethered and take the shape and functionality of an earpiece. Thereafter, with a service running on the user's phone, the user may place calls through the auxiliary cellular phone module 109.

In other embodiments, more elements may be available in the auxiliary cellular phone module 109. For example, a battery and charging dock may be available so as to eliminate the need for power sharing by the master cellular telephone 151. A further Bluetooth radio that eliminates the requirement for docking the auxiliary cellular phone module 109 and master cellular telephone 151 may be available. The master cellular telephone 151 may also disable its cellular radio circuitry to conserve power when in range of or docked to its auxiliary cellular phone module 109 counterpart. A display may be available to indicate status, for instance. A local phonebook and advertising memory may also be available in the auxiliary cellular phone module 109 to help the user with accommodations, restaurants, sight-seeing, taxis, and so forth. A single or multiple button interfaces may be available for placing emergency or other calls. GPS, media players, microphones, and any other functionality that might be typically found on a master cellular telephone 151 could be added as well.

In addition, if the master cellular telephone 151 fails or performs unacceptably for any reason, the user may also invoke the auxiliary cellular phone module's 109 services loaded on the master cellular telephone 151. For instance, the user may interact via the auxiliary cellular phone module 109 in a car (that has a very good external antenna and continuous power from a car jack). The auxiliary cellular phone module 109 may also be kept in the pocket of a user or be constructed so that it doubles as a wireless headset. The auxiliary cellular phone module 109 may also be designed to dock with the master cellular telephone 151 or to tether. It is also possible to switch between the auxiliary cellular phone module 109 and master cellular telephone 151 on a call by call or data stream by data stream basis. For example, the user may run a first data stream through master cellular telephone 151 while maintaining a three way call through two auxiliary cellular phone modules 109 using the auxiliary cellular phone module's 109 conferencing service that runs on the master cellular telephone 151.

Additional features that are associated with the auxiliary cellular phone module 109 may include: (a) Automatic dispensing of the auxiliary cellular phone module 109 via an ATM or candy machine-like kiosk; (b) Payments (cash or card) loaded into the auxiliary cellular phone module 109 anywhere; (c) Association with a current master cellular telephone 151 is simultaneously processed; (d) Testing is done before dispensing; (e) Prepaid amount features and functionality could be selected and a correct, updated auxiliary cellular phone module 109 is installed; (f) A kiosk has a cell phone port dock through which the interaction is conducted; (g) A kiosk has a return process and deposit return facility, if the auxiliary cellular phone module 109 is not disposable or is a permanent sale; (h) Reloading "credit" on the auxiliary cellular phone module 109 is handled in the same way as credit is installed on regular cell phones but via the interface on the "coupled phone" if the auxiliary cellular phone module 109 does not have one; and (i) Selection of one of a plurality of available operators and monthly programs is set up for the auxiliary cellular phone module 109 via the kiosk and wherein the auxiliary cellular phone module 109 is gratis; (j) Account data is collected; (k) Particular interest areas selected by a purchaser could result in sales or informational data being loaded into the auxiliary cellular phone module 109 phone before dispensing.

For instance, while roaming, the user of the master cellular telephone 151 may purchase an auxiliary cellular phone module 109, having certain prepaid credit balance upon it, in an airport kiosk or at a retailer in the roaming city. The user may also buy batteries to keep the auxiliary cellular phone module 109 working for the duration of stay in the roaming city. The user may have many options, depending upon visiting patterns to the roaming, that may easily include: (a) An extremely simplified auxiliary cellular phone module 109 (a black box with no user interfaces 121 at all), that is disposable after usage, if the visiting to the roaming city happens to be only once or an quick cost effective communication means become necessary for the user; (b) A simplified auxiliary cellular phone module 109 (having few user interfaces 121, such as just a small keypad or small display), that may be returned after usage, if the user expects to have many additional features available (and visiting to the roaming city happens to be of few weeks or months); (c) A full-fledged auxiliary cellular phone module 109 (having all of the user interfaces 121, such as a full-fledged keypad and/or large display), that may or may not be returned after usage, if the user expects to have all additional features available (and visiting to the roaming city happens to be of few weeks or months at a time, or frequency of visit is fairly high); or (d) Any of the other possible combinations of features that the roaming operator is willing to provide.

Once purchased and powered (or charged), the auxiliary cellular phone module 109, using wired 131, 143 or wireless 133, 141 features (such as a Bluetooth connection), pairs with the master cellular telephone 151 (here, the user enters pairing key code in case of a Bluetooth connection) and begins to operate effectively as a local cellular phone (in conjunction with the paired master cellular telephone 151). In other words, the user may use any of the user interfaces of either or both of auxiliary cellular phone module 109 and master cellular telephone 151 to place a local call by using the services of the roaming operator. As such, the combination of both of auxiliary cellular phone module 109 and master cellular telephone 151 may provide many features that either help cut costs to the user or provide additional information to the user.

Figure 2:
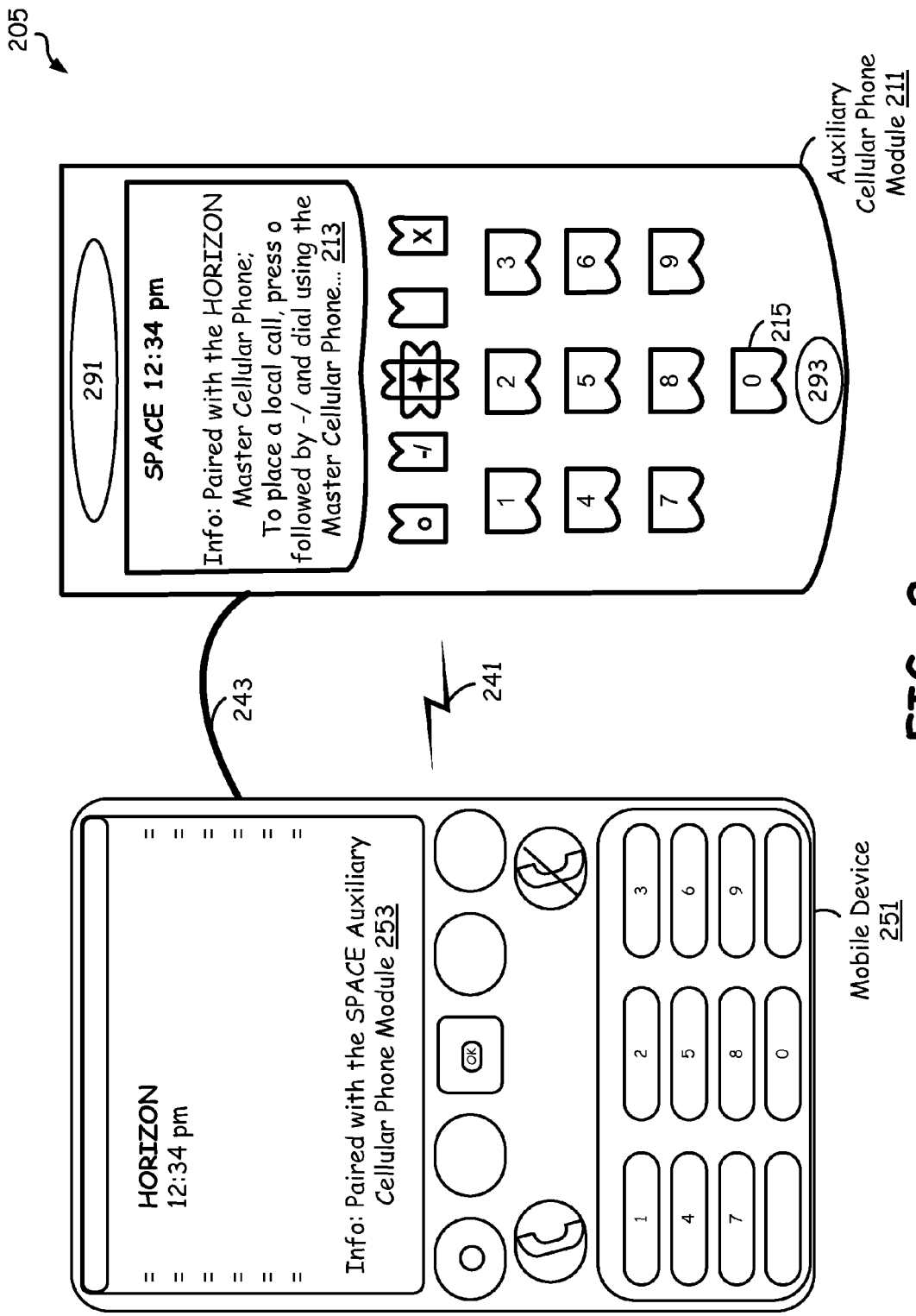
FIG. 2 is a schematic diagram depicting a physical appearance of the auxiliary cellular phone module of FIG. 1.

FIG. 2 is a schematic diagram depicting a physical appearance of the auxiliary cellular phone module of FIG. 1. Shown in FIG. 2 is the auxiliary cellular phone module 211 of FIG. 1 that assists in making a local call while roaming, wherein the user interfaces 213, 215 of the auxiliary cellular phone module 211 consists of a display 213 and keypad 215 (along with wired 243 and/or wireless 241 interfaces, earpiece, speakers 291 and microphones 293), in accordance with a first embodiment of the present invention. The auxiliary cellular phone module 211 of the current depiction, in specific, contains more or less all of the features (user interfaces) of a typical cellular phone handset (as described with reference to the FIG. 1), and externally visible is a keypad 215, display 213, speakers 291 (or, earpiece) and microphone 293.

The display 213 of the auxiliary cellular phone module 211 may provide roaming operator relevant, user relevant, or advertisement information. For instance, once the auxiliary cellular phone module 211 is paired with the master cellular telephone (mobile phone) 251, may provide the information such as "Paired with the <<HORIZON>> master cellular telephone successfully; to place a local call press <<o>> button followed by <</-> button and use your <<HORIZON>> phone as usual"; wherein the contents within the << >> are master cellular telephone 251 or the auxiliary cellular phone module 211 relevant information, such as the phone name, manufacturer or operator's name, or button names. In addition, while the auxiliary cellular phone module 211 is not in use, the display 213 may display advertisements (or the speaker 291 may announce directions) that are pertinent to the locality in which the user resides or happened to be. For instance, during a morning walk, if the user happens to carry along the auxiliary cellular phone module 211, it may announce that there is a restaurant nearby for breakfast and any more or other similar information or advertisements. This helps the roaming operator to cut costs to the user.

Alternatively, the very same information or advertisement may be transferred to the master cellular telephone 251, by the auxiliary cellular phone module 211, to be displayed on the display 253 or to be announced in the master cellular telephone's 251 speakers, via wireless 241 or wired 243 interfaces. The keypad 215 may have very same typical usage as any other cellular phones; nonetheless, if the user prefers to use only the master cellular telephone 251, then the keypad 215 may be used only minimally (refer to the descriptions of FIG. 3 through 6, for other embodiments, with minimal user interfaces).

Figure 3:
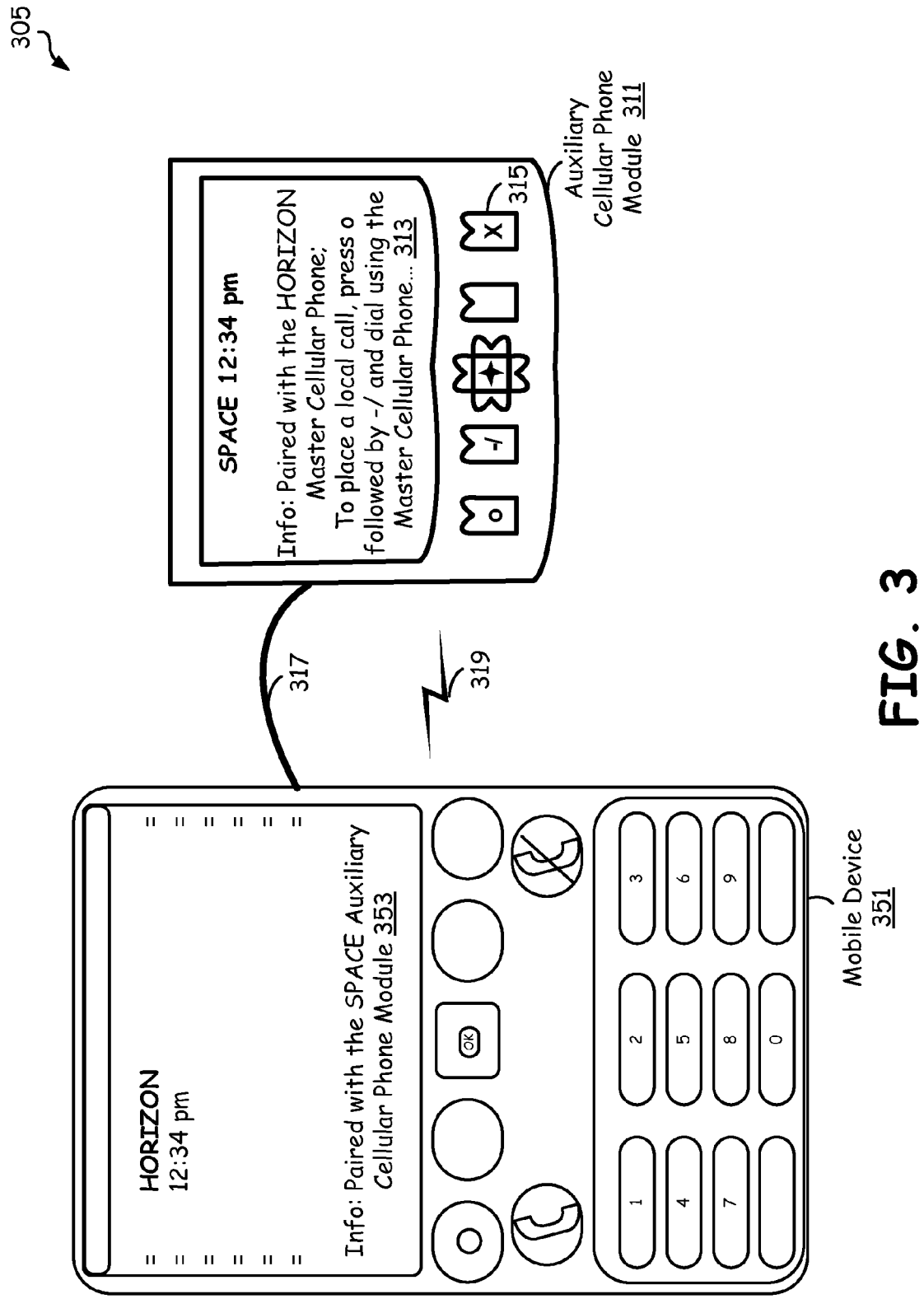
FIG. 3 is a schematic block diagram illustrating a physical appearance of another auxiliary cellular phone module constructed in accordance with one or more embodiments of the present invention.

FIG. 3 is a schematic block diagram illustrating a physical appearance of another auxiliary cellular phone module constructed in accordance with one or more embodiments of the present invention. In particular, FIG. 3 illustrates the physical appearance of an auxiliary cellular phone module 311 of FIG. 1 that assists in making a local call while roaming, wherein the depiction illustrates simplified user interfaces 313, 315 of the auxiliary cellular phone module 311 consisting a display 313 and simplified keypad 315 (along with wired 317 and/or wireless 319 interfaces, earpiece and microphones—not explicitly depicted), in accordance with a second embodiment of the present invention. The depicted auxiliary cellular phone module 311, in specific, contains fewer features (user interfaces) than that of a typical cellular phone handset (as described with reference to the FIG. 1), externally visible is a simplified keypad 315, and full-fledged display 313 (possibly, along with speakers, earpiece and microphones—not shown).

As described with reference to the FIG. 2, the display 313 of the auxiliary cellular phone module 311 or the display 353 of the master cellular telephone 351, once paired with the master cellular telephone 351 successfully (using wired 317 or wireless 319 interfaces), may display one of roaming operator relevant, user relevant or advertisement information. Alternatively, the same may be provided as announcements via speakers, in either of the auxiliary cellular phone module 311 or master cellular telephone 351. The simplified keypad 315 may still provide sufficient functionality to the user, such as placing calls using the phone book of the master cellular telephone 351 or placing emergency calls. Other functions, than the ones provided in the auxiliary cellular phone module's 311 minimal keypad 315, may be made up by the keypad of the master cellular telephone 351.

The display 313 or 353 of the auxiliary cellular phone module 311 or master cellular telephone 351, for instance, provides information such as "Paired with the <<HORIZON>> master cellular telephone successfully; to place a local call press <<o>> button followed by <</->> button and use your <<HORIZON>> phone as usual"; wherein the contents within the << >> are master cellular telephone 351 or the auxiliary cellular phone module 311 relevant information, such as the phone name, manufacturer or operator's name, or button names. In addition, while the auxiliary cellular phone module 311 is not in use, the display 313 may display advertisements (or the speaker may announce directions) that are pertinent to the locality in which the user resides and happened to be.

Figure 4:
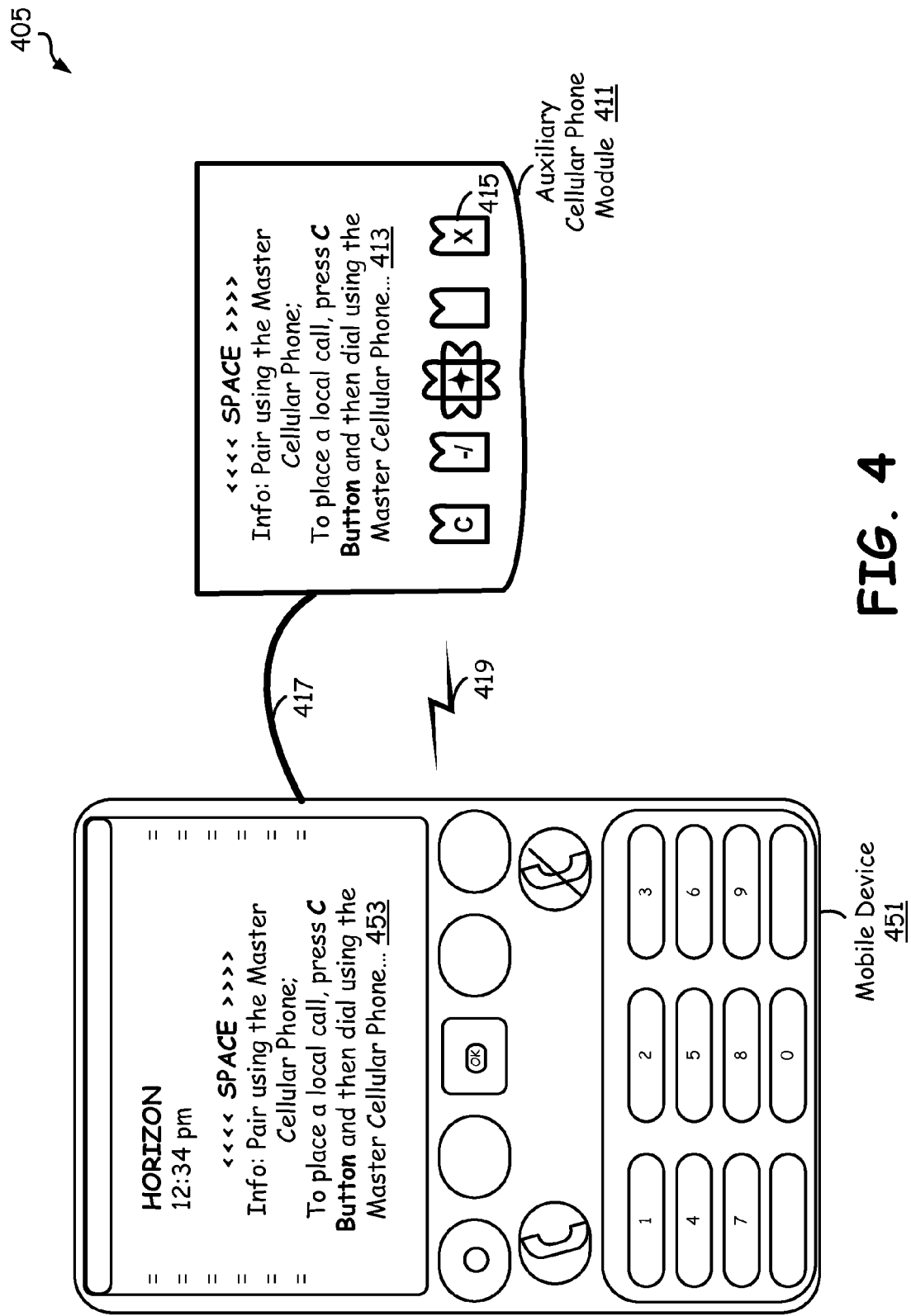
FIG. 4 is a schematic block diagram illustrating the physical appearances of yet another auxiliary cellular phone module constructed in accordance with one or more embodiments of the present invention.

FIG. 4 is a schematic block diagram illustrating the physical appearances of yet another auxiliary cellular phone module constructed in accordance with one or more embodiments of the present invention. In particular, FIG. 4 shows the physical appearance of the auxiliary cellular phone module 411 of FIG. 1 that assists in making a local call while roaming, wherein the depiction illustrates simplified user interfaces 415 of the auxiliary cellular phone module consisting of only a simplified keypad 415 (along with wired 417 and/or wireless 419 interfaces, earpiece and microphones—not explicitly depicted), in accordance with a third embodiment of the present invention. The auxiliary cellular phone module 411 contains far fewer features (user interfaces) than that of a typical cellular phone handset (as described with reference to the FIG. 1), externally visible is only a simplified keypad 415 and no display at all (possibly, along with speakers, earpiece and microphones—not shown).

In place of the display, a written instruction 413 may be provided, such as, "Pair using the Master cellular telephone; To place a local call, press <<C>> Button and then dial using the Master cellular telephone . . . "; wherein the contents within the << >> are master cellular telephone 451 or the auxiliary cellular phone module 411 relevant information, such as the phone name, manufacturer or operator's name, or button names.

The display 453 of the master cellular telephone 451, once paired with the master cellular telephone 451 successfully (using wired 417 or wireless 419 interfaces), may display any additional information, such as roaming operator relevant, user relevant or advertisement information, by transferring the information from the auxiliary cellular phone module 411. Alternatively, the same may be provided as announcements via speakers, in either of the auxiliary cellular phone module 411 or master cellular telephone 451. The simplified keypad 415 may still provide sufficient functionality to the user to place calls from the phone book of the master cellular telephone 451 or emergency calls. Other functions than the ones provided in the auxiliary cellular phone module's 411 minimal keypad, may be made up by the keypad of the master cellular telephone 451. In addition, while the auxiliary cellular phone module 411 is not in use, the display 413 may display advertisements (or the speaker may announce directions) that are pertinent to the locality in which the user resides and happened to be. For instance, during an evening stroll on a street, the auxiliary cellular phone module 411 may display or announce the names of shops nearby, of whom the user may be interested in.

Figure 5:
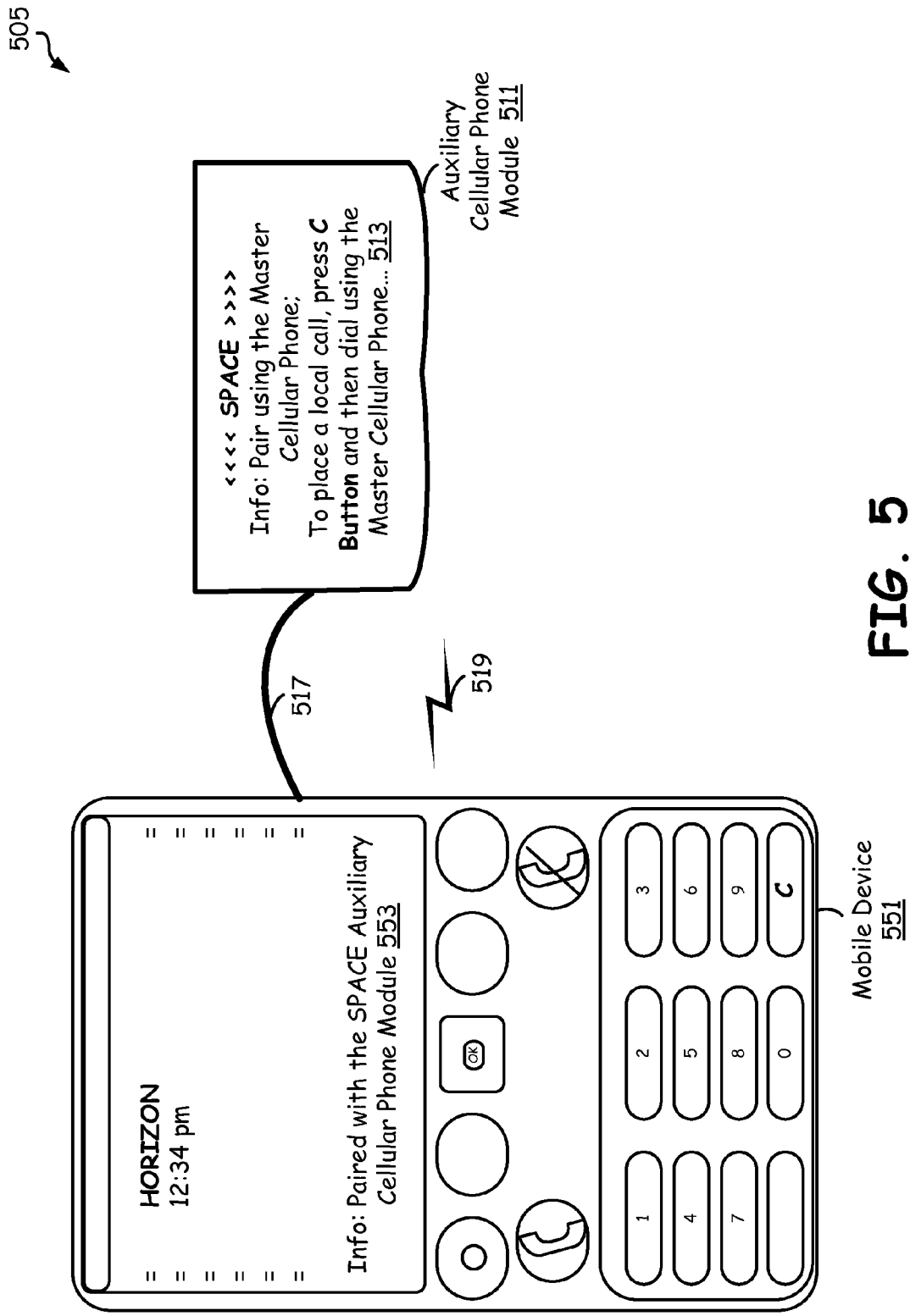
FIG. 5 is a schematic block diagram illustrating the physical appearances of still another auxiliary cellular phone module constructed in accordance with one or more embodiments of the present invention.

FIG. 5 is a schematic block diagram illustrating the physical appearances of still another auxiliary cellular phone module constructed in accordance with one or more embodiments of the present invention. In particular, FIG. 5 shows the physical appearance of the auxiliary cellular phone module 511 of FIG. 1 that assists in making a local call while roaming, wherein the depiction illustrates extremely simplified user interfaces of the auxiliary cellular phone module 511 having bare minimal interfaces (depiction shows no display or keypad; nonetheless, having wired 517 and/or wireless interfaces 519, and optional earpiece and/or microphones—not explicitly depicted), in accordance with a fourth embodiment of the present invention.

In specific, the current embodiment consists of no user interfaces at all. That is, the user can only use it in conjunction with the master cellular telephone 551, but in no other ways. Some variant embodiments may still have one or two buttons, speaker and microphones, and may allow the user to make emergency calls. Similar to the embodiment of the FIG. 4, a written instruction, such as "Pair using the Master cellular telephone; To place a local call, press <<C>> Button of the Master cellular telephone and then dial using the Master cellular telephone as usual . . . " (wherein the contents within the << >> are master cellular telephone 551 or the auxiliary cellular phone module 511 relevant information, such as the phone name, manufacturer or operator's name, or button names) may be provided on the surface of the black box auxiliary cellular phone module 511. Moreover, the auxiliary cellular phone module 511 may consist of far fewer features than that of a typical cellular phone handset, but still may have wired 517 and/or wireless interfaces 519 interfaces to work in conjunction with the master cellular telephone 551.

As was the case with the embodiment of FIG. 4, the display 553 of the master cellular telephone 551, once paired with the master cellular telephone 551 displays all roaming operator relevant, user relevant or advertisement information on behalf of the auxiliary cellular phone module 511. The same may also be announced via speakers in the master cellular telephone 551. In addition, the auxiliary cellular phone module 511, when not in use, may display advertisements (or announce in the speaker) that are pertinent to the locality in which the user resides and happened to be.

Figure 6:
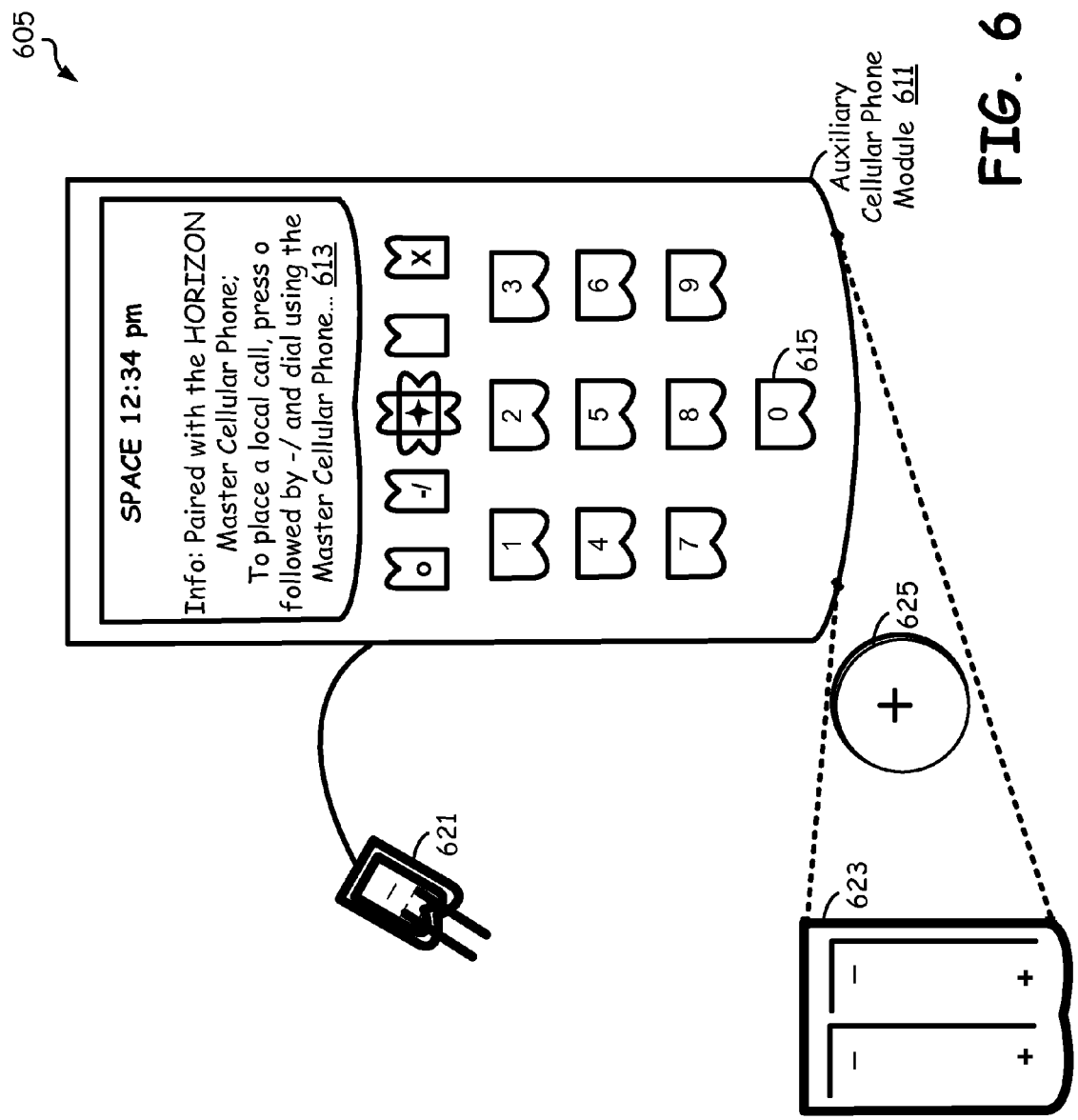
FIG. 6 is a schematic block diagram depicting the power supply for an auxiliary cellular phone module according to various embodiments of the present invention.

FIG. 6 is a schematic block diagram depicting the power supply for an auxiliary cellular phone module according various embodiments of the present invention. In particular, FIG. 6 shows differing power supplies 621, 623, or 625 for the auxiliary cellular phone module 611 of FIG. 1, including battery compartments 623 for disposable batteries and/or rechargeable battery facilities 621. The power supply, in general, may take many shapes and forms, that includes: (a) Button cells 625 (that comes along with disposable black box auxiliary cellular phone modules 611, fully charged and having a certain life span); (b) Battery compartments 623, to be fitted with batteries by the user (that typically comes along with reusable auxiliary cellular phone modules 611, the battery to be replaced by the user when the batteries run out of charge); (c) Rechargeable batteries, along with a charger 621, to be recharged by the user (that typically comes along with reusable auxiliary cellular phone modules 611); and (d) Deriving power supply via USB of the master cellular telephone 611; and (e) Rechargeable batteries, recharged by deriving power supply via USB of the master cellular telephone 611.

Typically, higher end auxiliary cellular phone modules 611 that in appearance and functionality may parallel with a typical cellular phone handset may come with higher end power supply units, such as the 623 and 625, while the lower end auxiliary cellular phone modules 611 may come with button cells or disposable cells. The depiction also shows keypads 615 and display 613 of a typical higher end full-fledged auxiliary cellular phone module 611.

FIG. 7 is a flow diagram illustrating operation of an auxiliary cellular phone module according to one or more aspects of the present invention. The functionality 705 begins at a block 709, when the auxiliary cellular phone module interfaces with a master cellular telephone (by an initial pairing, using a pairing key, in case of wireless technologies such as Bluetooth) to support loading of an auxiliary cellular phone module interoperability software onto the master cellular telephone. The auxiliary cellular phone module interoperability software assists in making phone calls using the auxiliary cellular phone module and by operating the user interfaces of the master cellular telephone.

At a next block 711, the auxiliary cellular phone module interfaces with the master cellular telephone to determine a roaming status of the master cellular telephone. Here, the auxiliary cellular phone module interoperability software continuously verifies the roaming status of the master cellular telephone, only if the master cellular telephone is roaming, the auxiliary cellular phone module proceeds to further with its operations of using the master cellular telephone to place calls.

At a next block 713, when the master cellular telephone is roaming, the auxiliary cellular phone module initiates a non-roaming cellular call on behalf of the master cellular telephone via cellular telephony interface. At a final block 715, the auxiliary cellular phone module services the cellular call on behalf of the master cellular telephone, by ways of communication passing between the master cellular telephone, communication interface and cellular telephony interface.

Figure 8:
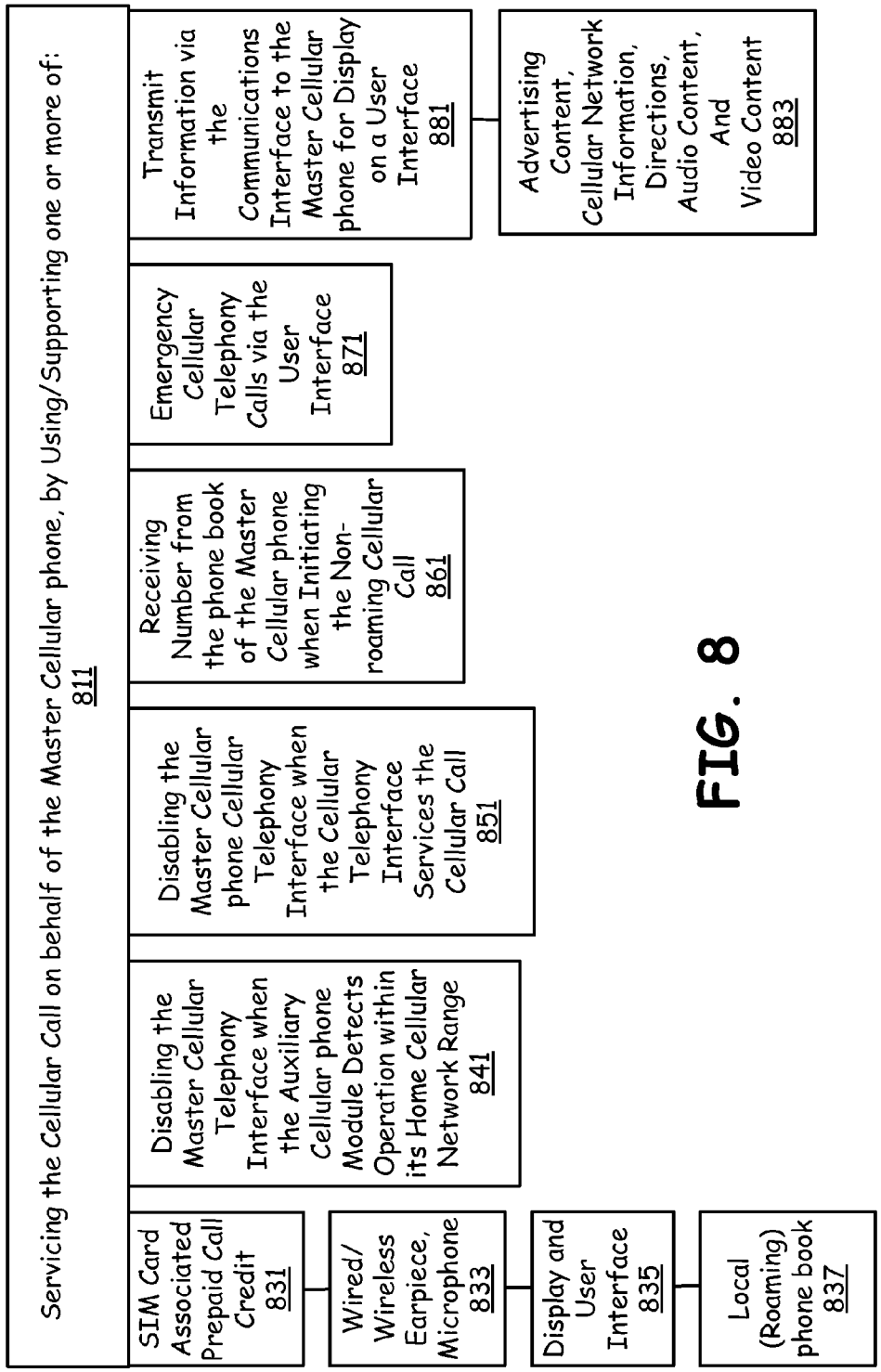
FIG. 8 is a flow diagram illustrating additional operations of an auxiliary cellular phone module according to one or more aspects of the present invention.

FIG. 8 is a flow diagram illustrating additional operations of an auxiliary cellular phone module according to one or more aspects of the present invention. The functionality 805 begins with the auxiliary cellular phone module servicing the cellular call on behalf of the master cellular telephone, by using and/or supporting one or more of the features of blocks 831, 833, 835, 837, 841, 851, 861, 871, 881, and/or 883. The abovementioned servicing of the cellular call on behalf of the master cellular telephone is equivalent to that of the block 715 of FIG. 7, that is, the auxiliary cellular phone module services the cellular call on behalf of the master cellular telephone, by ways of communication passing between the master cellular telephone, communication interface and cellular telephony interface.

At the block 831, the auxiliary cellular phone module places a call on the basis of a SIM card associated prepaid call credit. At the block 833, the auxiliary cellular phone module utilizes the wired and/or wireless interfaces, earpiece, speakers and microphones to place calls. At the block 835, the auxiliary cellular phone module utilizes the display and user interfaces (for instance, a keypad) to place calls. At the next block 837, the auxiliary cellular phone module utilizes the local (roaming) phone book to place calls. Between the blocks 831, 833, 835 and 837, the auxiliary cellular phone module works almost in a similar fashion as that of a typical prepaid cellular handset features.

The auxiliary cellular phone module, at the next block 841, disables master cellular telephony interface, when the auxiliary cellular phone module detects operation within its home cellular network range. This allows the auxiliary cellular phone module to place calls using its cellular telephony interface, when the master cellular phone is within its home range. At the next block 851, the auxiliary cellular phone module disables master cellular telephony interface, when the auxiliary cellular phone module is servicing a cellular call.

At the next block 861, the auxiliary cellular phone module receives a number from the master cellular phone, when initiating a new non-roaming cellular call. By this, user is able to place a call, using the auxiliary cellular phone module, without redialling the entire number and instead using an address book or call list of the master cellular phone. At the next block 871, the auxiliary cellular phone module allows the user to place emergency calls using the user interface of the auxiliary cellular phone module.

At the next block 881, the auxiliary cellular phone module transmits information via the communications interface to the master cellular telephone, for display or announcement via speakers. At the next and final block 883, the auxiliary cellular phone module displays, using the master cellular telephone display, one of advertisement content, cellular network information, directions, and any other video contents.

Figure 9:
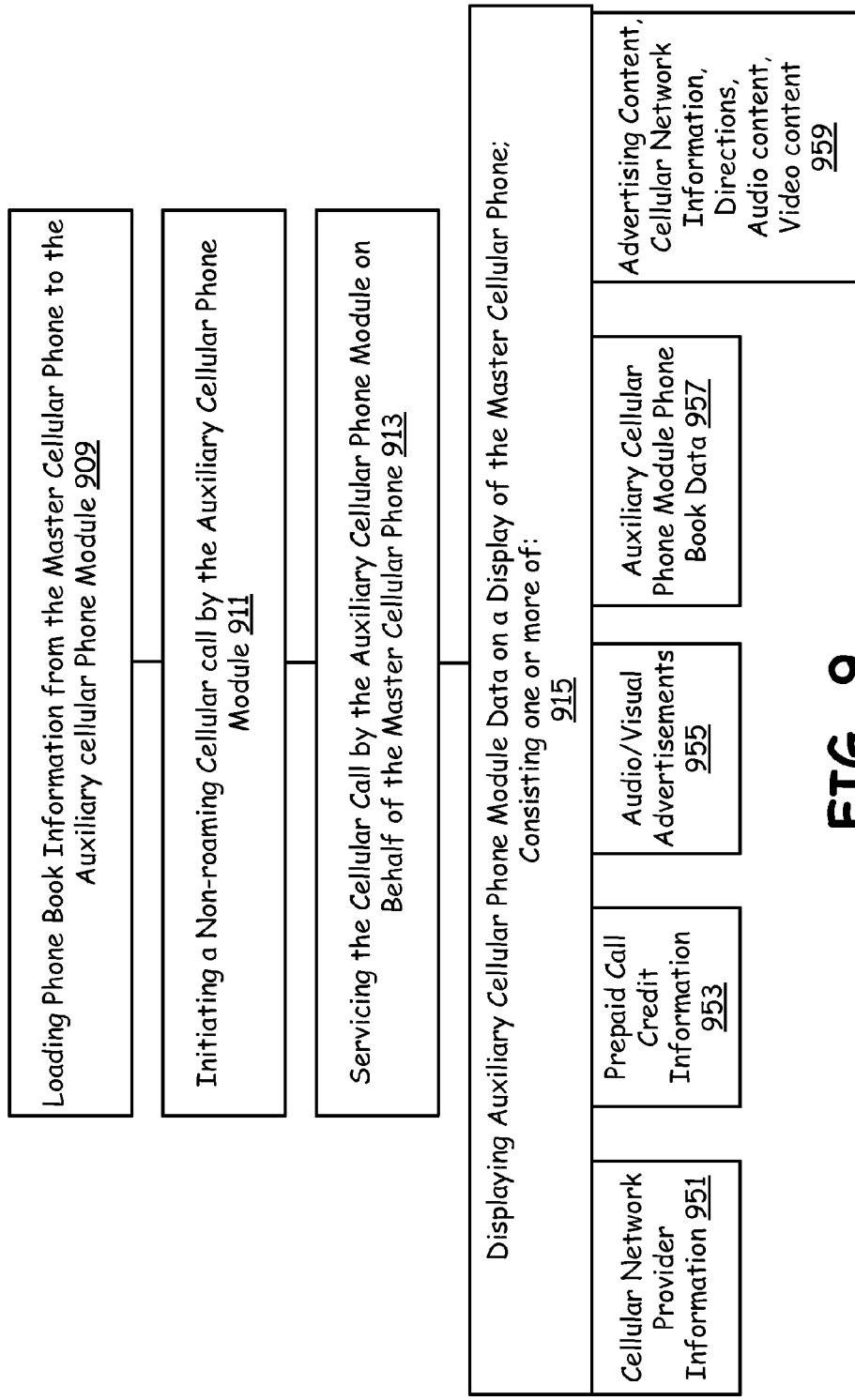
FIG. 9 is a flow diagram illustrating still other operations of an auxiliary cellular phone module according to one or more aspects of the present invention.

FIG. 9 is a flow diagram illustrating still other operations of an auxiliary cellular phone module according to one or more aspects of the present invention. The functionality 905 begins at a block 909 when the auxiliary cellular phone module loads phone book information from the master cellular phone to the auxiliary cellular phone module. At a next block 911, the auxiliary cellular phone module initiates a non-roaming cellular call by the auxiliary cellular phone module 911. At a next block 913, the auxiliary cellular phone module services the cellular call by the auxiliary cellular phone module on behalf of the master cellular phone. At a next block 915, the auxiliary cellular phone module displays auxiliary cellular phone module data on a display of the master cellular phone (or even that of the auxiliary cellular phone module), consisting one or more of the blocks 951, 953, 955, 957 and 959.

At the block 951, the auxiliary cellular phone module displays cellular provider network information. At the block 953, the auxiliary cellular phone module displays prepaid call credit information. At the next block 955, the auxiliary cellular phone module displays audio/visual advertisements. At the next block 957, the auxiliary cellular phone module displays auxiliary cellular phone module phone book data. At the next block 959, the auxiliary cellular phone module displays one of advertisement content, cellular network information, directions, and any other video contents.

Figure 10:
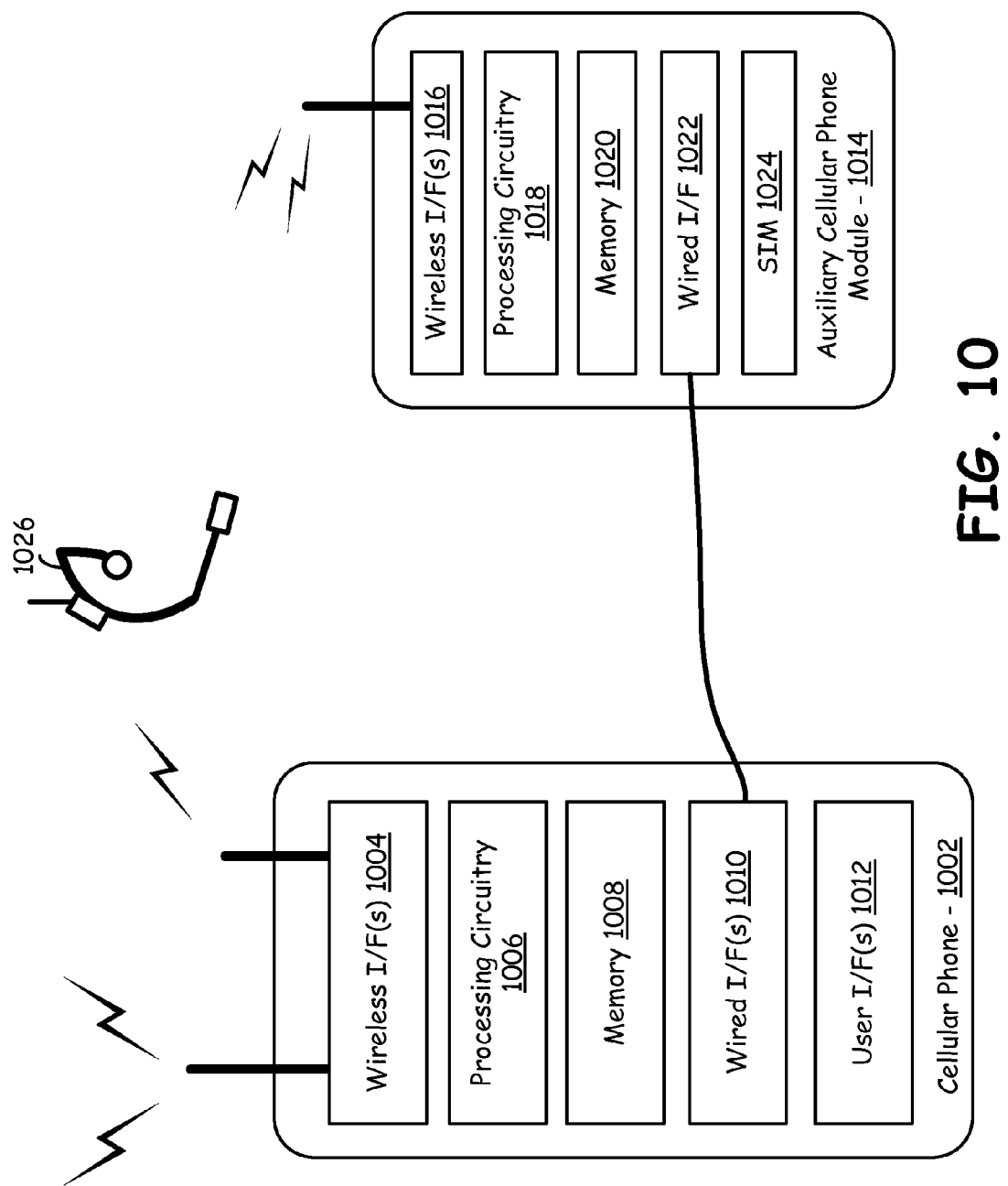
FIG. 10 is a schematic block diagram illustrating another auxiliary cellular phone module that assists in making a call according to one or more embodiments of the present invention.

FIG. 10 is a schematic block diagram illustrating another auxiliary cellular phone module that assists in making a call according to one or more embodiments of the present invention. The auxiliary cellular phone module 1014 services a cellular telephone 1002 via a wired and/or wireless link. The cellular telephone 1002 includes one or more wireless interfaces 1004, which include a cellular wireless interface and one or more of a Wireless Local Area Network (WLAN) interface, e.g., IEEE 802.11x, a Wireless Wide Area Network (WWAN) interface, e.g., WiMAX, a Wireless Personal Area Network (WPAN) interface, e.g., Bluetooth™ or another type of wireless interface that services communications with the auxiliary cellular phone module 1014 and/or wireless headset 1026 (microphone and speaker combination that services user audio and/or multimedia communications). The wireless headset 1026 may communicate with the cellular telephone 1002 and/or the auxiliary cellular phone module 1014 via WPAN communications, for example.

The cellular telephone 1002 further includes processing circuitry 1006, memory 1008, one or more wired interfaces 1010, and one or more user interfaces 1012. The processing circuitry may be one or more of a microprocessor, a digital signal processor, an application specific integrated circuit, custom logic circuitry, or another type of circuitry operable to execute software instructions and process data, the software instructions and data stored in the memory. The memory 1008 is one or more of RAM, ROM, Flash RAM, Flash ROM, magnetic memory, optical memory, or another type of memory operable to store software instructions and data and allow access thereto. The wired interfaces 1010 may be more of a serial interface, e.g., USB or Firewire, a parallel interface, an optical interface, or a combination thereof that supports wired communications, with the auxiliary cellular phone module 1014, for example. The user interfaces 1012 may include a display, a keypad, a pointing input device, a microphone, a speaker, or another type of user interface device.

The auxiliary cellular phone module 1014 includes one or more wireless interfaces 1016 that service cellular, WWAN, WLAN, and/or WPAN communications. As has been previously described, the auxiliary cellular phone module 1014 services cellular communications for the cellular telephone 1002 under various operational situations. The auxiliary cellular phone module 1014 further includes processing circuitry 1018, memory 1020, one or more wired interfaces 1022, and a SIM card. Further, each of the cellular telephone 1002 and the auxiliary cellular phone module 1014 may include a battery, a case, and/or various other elements typical to a wireless communication device.

According to various additional aspects of the present invention the auxiliary cellular phone module 1014 may receive a call service direction from the master cellular phone 1002 when a SIM card of the master cellular phone 1002 has insufficient funds. In such case, the master cellular phone 1002, even when in its home network may redirect a call initiation request received from a user to the auxiliary cellular phone module 1014 for servicing. As an option, the cellular phone 1002 and/or the auxiliary cellular phone module 1014 may notify the user of the potential operation prior to completing the call.

According to another operation according to the present invention, the auxiliary cellular phone module 1014 may receive a call service direction from the master cellular phone 1002 when the master cellular phone 1002 desires to hide its identity. For example, the user of the master cellular phone 1002 may desire not to become active in a particular geographic region or locale. In such case, the user may connect his/her cellular phone 1002 to the auxiliary cellular phone module 1014 without activating a cellular wireless interface 1004 of the master cellular phone 1002. In such case, the auxiliary cellular phone module 1014 registers with one or more local cell phone networks and services calls via such networks, without disclosing the presence of the master cellular phone 1002. Of course, these operations may be initiated at any time when identity concealment is desired.

According to still another aspect of the present invention, the auxiliary cellular phone module 1014 may establish wireless communications with the wireless headset 1026 and service audio data exchange therewith. For example, while the wireless headset 1026 may be primarily paired with the master cellular phone 1002, for a call being serviced by the auxiliary cellular phone module 1014, the wireless headset 1026 may communicate directly with the auxiliary phone module 1014 to service the voice communication. In an alternate operation, the master cellular phone 1002 may act as an intermediary between the wireless headset 1026 and the auxiliary cellular phone module when servicing communications there between.

Figure 11:
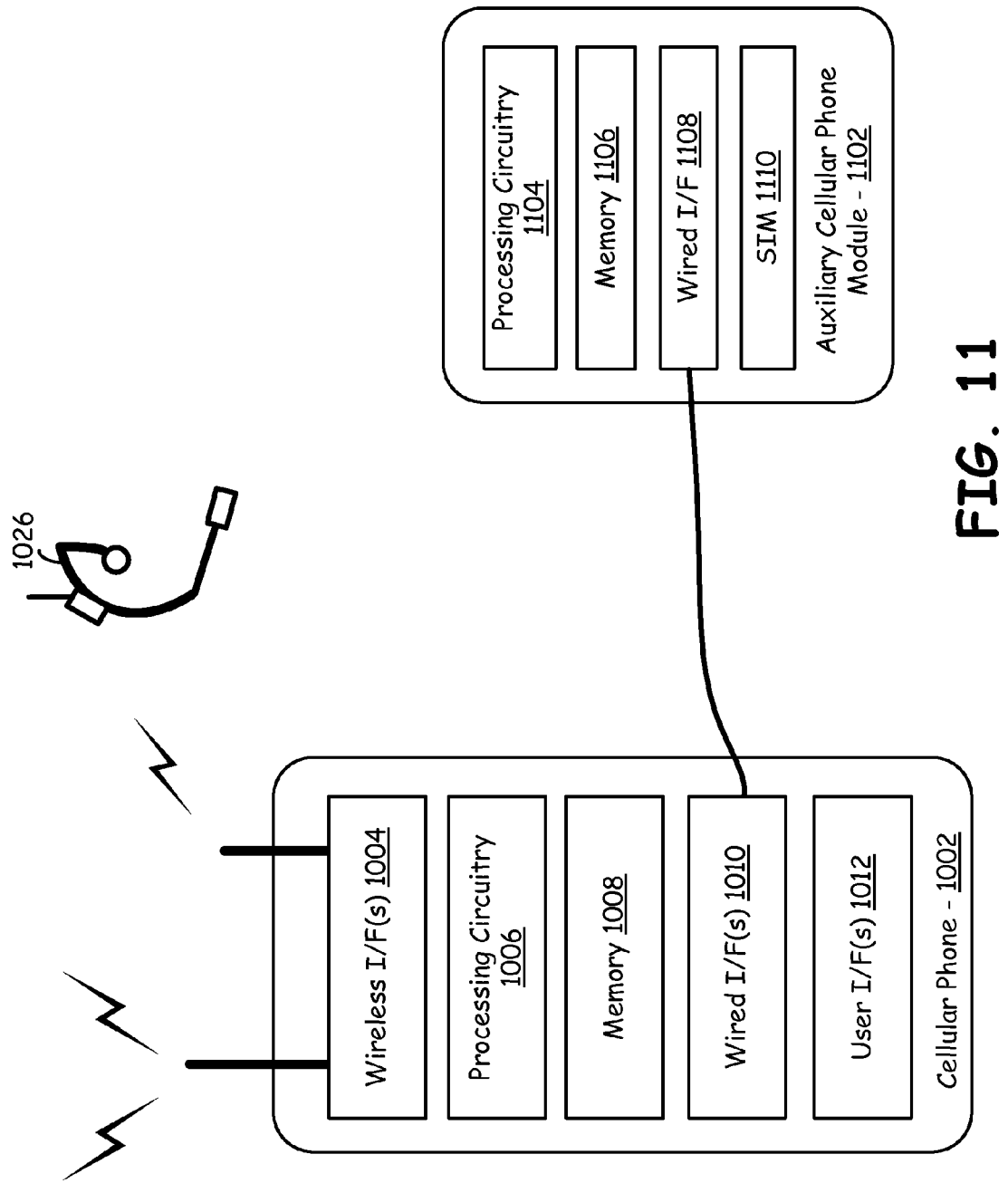
FIG. 11 is a schematic block diagram illustrating yet another auxiliary cellular phone module that assists in making a call according to one or more embodiments of the present invention.

FIG. 11 is a schematic block diagram illustrating yet another auxiliary cellular phone module that assists in making a call according to one or more embodiments of the present invention. The structure of the master cellular phone 1002 and the wireless headset 1026 of FIG. 11 is same/similar as the commonly number devices of FIG. 10. The auxiliary cellular phone module 1102 of FIG. 11 includes processing circuitry, memory 1106, a wired interface 1108, and a SIM card. The auxiliary cellular phone module 1102 of FIG. 11 may simply serve as an external SIM card for the master cellular phone module 1002. Further, the auxiliary cellular phone module 1102 of FIG. 11 may also provide phone book functions, advertising, and other information to the master cellular phone 1002. The auxiliary cellular phone module 1102 may have a battery or receive power from the master cellular phone 1002.

FIG. 12A is a flow diagram illustrating still other operations of an auxiliary cellular phone module according to one or more aspects of the present invention. Operations 1205 commence with the user initiating a cell phone call using a wireless headset as the audio interface for the call (Step 1209). Operation continues with the auxiliary cellular phone module servicing the call (Step 1211). The master cellular phone then redirects packets carrying audio (and optionally multimedia) to the wireless headset to the auxiliary cellular phone module (Step 1213). In doing so, the wireless headset may wirelessly communicate with the auxiliary cellular phone module. Alternately, the master cellular phone may forward packets between the wireless headset and the auxiliary cellular phone module. The auxiliary cellular phone module then services the call via the wireless headset for the user (Step 1215).

FIG. 12B is a flow diagram illustrating still other operations of an auxiliary cellular phone module according to one or more aspects of the present invention. Operations 1225 commence with a user attempting to initiate a cell phone call via the master cellular phone (Step 1229). The master cellular phone, however, determines that its SIM card has no remaining credit (or has credit below a credit threshold, Step 1231). The master cellular phone then directs the auxiliary cellular phone module to service the call (Step 1233). The auxiliary cellular phone module then services the call using credit from its SIM or via a subscription (Step 1235).

FIG. 13 is a flow diagram illustrating additional operations of an auxiliary cellular phone module according to one or more aspects of the present invention. Operation 1302 commences with the user directing the master cellular phone to hide its identity (Step 1302). Requesting that that master cellular phone hide its identity may occur when the user powers up the master cellular phone in a new locale prior to its registration within the locale or at any point in time thereafter. The master cellular phone then directs the auxiliary cellular phone module to service a call (Step 1304). The auxiliary cellular phone module then services the call (Step 1306).

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip", as used herein, refers to an integrated circuit. Circuits and circuitry may comprise general or specific purpose hardware, or may comprise such hardware and associated software such as firmware or object code.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. An auxiliary cellular phone module operable to work in conjunction with a master cellular phone, the auxiliary cellular phone module comprising:
 a cellular telephony interface operable to support communications with a cellular network;
 a communications interface operable to support communications with the master cellular phone;
 a System Interface Module (SIM);
 processing circuitry coupled to the cellular telephony interface, to the SIM, and to the communications interface, the processing circuitry operable to:
  interface with the master cellular phone to determine a roaming status of the master cellular phone;
  when the master cellular phone is roaming, initiate a non-roaming cellular call on behalf of the master cellular phone via the cellular telephony interface; and
  service the cellular call on behalf of the master cellular phone, wherein in servicing the cellular call, communications pass between the master cellular phone, the communications interface, and the cellular telephony interface.

2. The auxiliary cellular phone module of claim 1, wherein the processing circuitry is further operable to interface with the master cellular phone to support loading of auxiliary cellular phone module interoperability software onto the master cellular phone.

3. The auxiliary cellular phone module of claim 1, wherein the communications interface further comprises at least one power connection operable to support powering of the cellular telephony interface and the processing circuitry by the master cellular phone.

4. The auxiliary cellular phone module of claim 1, wherein the communications interface comprises a wired serial interface.

5. The auxiliary cellular phone module of claim 1:
 further comprising an earpiece and a microphone coupled to the processing circuitry; and
 wherein the processing circuitry is operable to support audio communications with a user via the earpiece, microphone, and communications interface.

6. The auxiliary cellular phone module of claim 1, further comprising a battery coupled to the cellular phone interface and to the processing circuitry.

7. The auxiliary cellular phone module of claim 1, wherein the communications interface comprises a wireless network interface operable to wirelessly communicate with the master cellular phone to support communications between the master cellular phone and the cellular telephony interface.

8. The auxiliary cellular phone module of claim 1, wherein the processing circuitry is operable to receive a called number from a phone book of the master cellular phone when initiating the non-roaming cellular call.

9. The auxiliary cellular phone module of claim 1, wherein the SIM further comprises a SIM card having associated therewith a prepaid call credit.

10. The auxiliary cellular phone module of claim 1, further comprising at least one of a display and a user interface.

11. The auxiliary cellular phone module of claim 10, wherein the processing circuitry is further operable to support emergency cellular telephony calls via the user interface.

12. The auxiliary cellular phone module of claim 1, wherein the processing circuitry is further operable to support a local phone book.

13. The auxiliary cellular phone module of claim 1, wherein the processing circuitry is further operable to transmit information via the communications interface to the master cellular phone for display on a user interface of the master cellular phone.

14. The auxiliary cellular phone module of claim 13, wherein the information comprises at least one of advertising content, cellular network information, directions, audio content, and video content.

15. The auxiliary cellular phone module of claim 1, wherein the processing circuitry is further operable to direct the master cellular phone to disable a master cellular phone cellular telephony interface when the cellular telephony interface services the cellular call.

16. The auxiliary cellular phone module of claim 1, wherein the processing circuitry is further operable to direct the master cellular phone to disable a master cellular phone cellular telephony interface when the auxiliary cellular phone module detects operation within its home cellular network.

17. The auxiliary cellular phone module of claim 1, wherein the processing circuitry is further operable to direct the master cellular phone to disable a master cellular phone cellular telephony interface when the auxiliary cellular phone module detects operation within its home cellular network.

18. The auxiliary cellular phone module of claim 1, wherein the processing circuitry is further operable to receive a call service direction from the master cellular phone when a SIM card of the master cellular phone has insufficient funds.

19. The auxiliary cellular phone module of claim 1, wherein the processing circuitry is further operable to receive a call service direction from the master cellular phone when the master cellular phone hides its identity.

20. The auxiliary cellular phone module of claim 1:
further comprising a wireless interface; and
the processing circuitry is further operable to service user communications with a user headset via the wireless interface.

21. A method for operating an auxiliary cellular phone module to work in conjunction with a master cellular phone, the method comprising:
interfacing the auxiliary cellular phone module to the master cellular phone via a communications interface of the auxiliary cellular phone module;
loading auxiliary cellular phone module interoperability software onto the master cellular phone;
interfacing with the master cellular phone to determine a roaming status of the master cellular phone;
initiating a non-roaming cellular call on behalf of the master cellular phone via a cellular telephony interface of the auxiliary cellular phone module when the master cellular phone is roaming; and
servicing the cellular call on behalf of the master cellular phone via the cellular telephony interface and the communications interface.

22. The method of claim 21, wherein servicing the cellular call on behalf of the master cellular phone comprises supporting audio communications with a user via an earpiece, a microphone, and communications interface of the auxiliary cellular phone module.

23. The method of claim 21, further comprising the auxiliary cellular phone module receiving power from the master cellular phone.

24. The method of claim 21, wherein servicing the cellular call on behalf of the master cellular phone via the cellular telephony interface and the communications interface comprises wirelessly coupling to the master cellular phone via the communications interface.

25. The method of claim 21 wherein initiating a non-roaming cellular call on behalf of the master cellular phone via a cellular telephony interface of the auxiliary cellular phone module when the master cellular phone is roaming includes receiving phone book information from the master cellular phone via the communications interface.

26. The method of claim 21, further comprising transmitting information via the communications interface to the master cellular phone for display on a user interface of the master cellular phone.

27. The method of claim 21, further comprising directing the master cellular phone to disable a master cellular phone cellular telephony interface when the cellular telephony interface services the cellular call.

28. The method of claim 21, further comprising directing the master cellular phone to disable a master cellular phone cellular telephony interface when the auxiliary cellular phone module detects operation within its home cellular network.

29. The method of claim 21, further comprising receiving a call service direction from the master cellular phone when a SIM card of the master cellular phone has insufficient funds.

30. The method of claim 21, further comprising receiving a call service direction from the master cellular phone when the master cellular phone hides its identity.

31. The method of claim 21, further comprising servicing communications with a user headset via a wireless interface.

32. A method for operating an auxiliary cellular phone module to work in conjunction with a master cellular phone, the method comprising:
loading phone book information from the master cellular phone to the auxiliary cellular phone module;
initiating a non-roaming cellular call by the auxiliary cellular phone module;
servicing the cellular call by the auxiliary cellular phone module on behalf of the master cellular phone; and
displaying auxiliary cellular phone module data on a display of the master cellular phone.

33. The method of claim 32, wherein the auxiliary cellular phone module data comprises cellular network provider information.

34. The method of claim 32, wherein loading phone book information from the master cellular phone to the auxiliary cellular phone module comprises receiving a previously called number from a phone book.

35. The method of claim 32, wherein displaying auxiliary cellular phone module data on a display of the master cellular phone comprises displaying an advertisement.

36. The method of claim 32, wherein displaying auxiliary cellular phone module data on a display of the master cellular phone comprises displaying prepaid call credit information.

37. The method of claim 32, wherein displaying auxiliary cellular phone module data on a display of the master cellular phone comprises displaying auxiliary cellular phone module phone book data.

38. The method of claim 32, wherein displaying auxiliary cellular phone module data on a display of the master cellular phone comprises displaying at least one of advertising content, cellular network information, directions, audio content, and video content.

* * * * *